United States Patent
Marianer et al.

(10) Patent No.: US 8,988,273 B2
(45) Date of Patent: Mar. 24, 2015

(54) SYSTEM AND METHOD FOR DETECTING CONCEALED EXPLOSIVES AND WEAPONS

(75) Inventors: Shlomo Marianer, Raanana (IL); Igal Greenberg, Hod Hasharon (IL); Eli Marom, Givatayim (IL); Zeev Shacham, Kiryat Ono (IL)

(73) Assignee: Israel Aerospace Industries Ltd., Lod (IL)

( * ) Notice: Subject to any disclaimer, the term of this patent is extended or adjusted under 35 U.S.C. 154(b) by 331 days.

(21) Appl. No.: 13/519,190

(22) PCT Filed: Dec. 27, 2010

(86) PCT No.: PCT/IL2010/001086
§ 371 (c)(1),
(2), (4) Date: Jun. 26, 2012

(87) PCT Pub. No.: WO2011/080737
PCT Pub. Date: Jul. 7, 2011

(65) Prior Publication Data
US 2012/0293355 A1    Nov. 22, 2012

(30) Foreign Application Priority Data
Dec. 29, 2009 (IL) .......................................... 203015

(51) Int. Cl.
*G01S 13/00* (2006.01)
*G01S 7/02* (2006.01)
*G01S 7/41* (2006.01)
*G01S 13/88* (2006.01)

(52) U.S. Cl.
CPC . *G01S 7/024* (2013.01); *G01S 7/41* (2013.01); *G01S 13/887* (2013.01)
USPC ............................... 342/22; 342/188; 342/189

(58) Field of Classification Search
CPC ............................... G01S 13/887; G01S 7/024
USPC ............................................ 342/22, 188, 189
See application file for complete search history.

(56) References Cited

U.S. PATENT DOCUMENTS

| 6,967,612 B1 * | 11/2005 | Gorman et al. ................. 342/22 |
| 7,304,603 B2 | 12/2007 | Reed et al. |
| 2012/0229322 A1 * | 9/2012 | Mostov ........................... 342/22 |

FOREIGN PATENT DOCUMENTS

JP    A-2009-210332    9/2009

OTHER PUBLICATIONS

Borghys et al., "Supervised Feature-Based Classification of Multi-Channel SAR Images," *Pattern Recognition Letters*, 2006, vol. 27, pp. 252-258.
Dogaru et al., "Through-the-Wall Small Weapon Detection Based on Polarimetric Radar Techniques," Dec. 2009, XP007918261.

(Continued)

*Primary Examiner* — Timothy A Brainard
(74) *Attorney, Agent, or Firm* — Oliff PLC

(57) ABSTRACT

A method for detecting hidden explosives or weapons, including transmitting a signal in different polarization channels towards an object, the next stage includes collecting back scattered energy in different polarization channels from the object, the next stage includes determining parameters that are dependent upon the transmitted signal polarization channels and the backscattered energy polarization channels, and providing an indication if there are hidden explosives or weapons in the object based on the parameters.

16 Claims, 5 Drawing Sheets

(56) References Cited

OTHER PUBLICATIONS

Sagues et al., "Polarimetric Radar Interferometry for Improved Mine Detection and Surface Clutter Rejection," *IEEE Transactions on Geoscience and Remote Sensing*, Jun. 2001, vol. 39, No. 6, pp. 1271-1278.

Cloude et al., "An Entropy Based Classification Scheme for Land Applications of Polarimetric SAR," *IEEE Transactions on Geoscience and Remote Sensing*, Jan. 1997, vol. 35, No. 1, pp. 68-78.

Cloude et al, "A Review of Target Decomposition Theorems in Radar Polarimetry," *IEEE Transactions on Geoscience and Remote Sensing*, Mar. 1996, vol. 34, No. 4, pp. 498-518.

* cited by examiner

SYSTEM AND METHOD FOR DETECTING CONCEALED EXPLOSIVES AND WEAPONS

FIELD OF THE INVENTION

This invention relates to a system and method for detecting concealed explosives and weapons.

BACKGROUND OF THE INVENTION

Terrorist activities have become a growing problem all over the world. These include suicide bombers carrying explosives, armed terrorists carrying various concealed weapons, and also missiles and launchers of different sizes hidden between bushes or other kind of vegetation.

RELATED ART

U.S. Pat. No. 6,967,612 discloses "a system and method for standoff detection of human carried explosives (HCE) is a portable system that automatically detects HCE up to a range of 200 meters and within seconds alerts an operator to HCE threats. The system has radar only, or both radar and video sensors, a multi-sensor processor, an operator console, handheld displays, and a wideband wireless communications link. The processor receives radar and video feeds and automatically tracks and detects all humans in a field of view. Track data continuously cues the narrow beam radar to a subject of interest, the radar repeatedly interrogating cued objects, producing a multi-polarity radar range profile for each interrogation event. Range profiles and associated features are automatically fused over time until sufficient evidence is accrued to support a threat/non-threat declaration hypothesis. Once a determination is made, the system alerts operators through a handheld display and mitigates the threat if desired."

There is a need in the art for detecting hostiles carrying explosives or weapons at a safe distance and provide appropriate alert in good time before the explosive and/or the weapons are activated against friendly targets, such as innocent civilians.

There is further need in the art for detecting a threat such as hidden missiles or launchers (e.g. concealed between bushes) and distinguishing between them and rocks, trees or other harmless detected objects, facilitating thus destruction or dismantling of the threat.

SUMMARY OF THE INVENTION

In accordance with certain embodiments, fully polarized coherent Frequency Modulation Continuous Wave (FMCW) radar is used to detect and track targets of interest. The usage of coherent FMCW radar facilitates generation of Range-Doppler maps in which the targets are detected and tracked down. The frequency of each pulse is linearly increasing and the total span covered is termed bandwidth. As is well known the FMCW enables to separate targets at different ranges where the range resolution is inversely proportional to the bandwidth. Consecutive pulses are then processed to obtain the Doppler frequency (proportional to target velocity projection on the radar line of sight). The Doppler resolution is inversely proportional to the integration time (i.e. number of pulses processed).

Reverting to the Range-Doppler maps, for each target detection along a track, correlations between different polarizations scattering matrix elements are analyzed. The nature of these correlations is shown to have features that enable identification of presence of explosives or concealed weapons and other targets of interest.

In accordance with certain embodiments, there is provided a system that includes a fully polarized coherent FMCW radar, an A2D and DSP card in a PC and a video camera used for monitoring purposes only. The system processes the data to obtain Range Doppler maps, performs target detection and calculates polarimetric features of the target in real time. The data is analyzed, and an alarm flag is turned on based on the results of the analysis.

Accordingly, there is provided a method for detecting hidden explosives or weapons, comprising
  (a) transmitting a signal in different polarization channels towards an object;
  (b) collecting back scattered energy in different polarization channels from the object;
  (c) determining parameters that are dependent upon at least the transmitted signal polarization channels and the backscattered energy polarization channels, providing an indication if there are hidden explosives or weapons in the object based on said parameters.

In accordance with certain embodiments, there is provided a method wherein said different polarization channels being horizontal polarization and vertical polarization.

In accordance with certain embodiments, there is provided a method wherein said object being a human.

In accordance with certain embodiments, there is provided a method wherein said object being bushes and wherein said explosives or weapons are concealed in the bushes.

In accordance with certain embodiments, there is provided a method wherein said determination of parameters stipulated in (c) includes
  i) evaluating full polarization scattering matrices of range Doppler cells that belong to the object;
  ii) calculating correlation between elements of the polarization scattering matrices giving rise to a covariance matrix;
  iii) analyzing polarimatric results for the covariance matrix; the polarimetric results include at least eigenvalues and corresponding eigenvectors, and
  iv) utilizing said eigenvalues and eigenvectors to determine whether to generate an indication that there are hidden explosives or weapons in the object.

In accordance with certain embodiments, there is provided a method wherein said transmitting being in circular polarization.

In accordance with certain embodiments, there is provided a method further comprising acquiring images of said object.

In accordance with certain embodiments, there is provided a method configured to be used on mobile platform for detecting hidden explosives or weapons in a stationary object.

In accordance with certain embodiments, there is provided a method configured to be used on a stationary platform for detecting hidden explosives or weapons in a stationary object.

In accordance with certain embodiments, there is provided a method wherein said object being bushes.

In accordance with certain embodiments, there is provided a method wherein said explosives or weapons include hidden missiles or launchers.

In accordance with certain embodiments, there is provided a method configured to be used on mobile platform for detecting hidden explosives or weapons in a moving object.

In accordance with certain embodiments, there is provided a method configured to be used on a stationary platform for detecting hidden explosives or weapons in a moving object.

In accordance with an aspect of the invention, there is provided a system for detecting hidden explosives or weapons, comprising
  transmitter configured to transmit a signal in different polarization channels towards an object;
  receiver configured to receive back scattered energy in different polarization channels from the object;
  a processor configured to determine parameters that are dependent upon at least the transmitted signal polarization channels and the backscattered energy polarization channels, providing an indication if there are hidden explosives or weapons in the object based on said parameters.

In accordance with certain embodiments, there is provided a method wherein the transmitter being a radar system configured to transmit a Frequency Modulated Continuous Wave (FMCW) or pulsed or CW signal.

In accordance with an aspect of the invention, there is provided a system for detecting hidden explosives or weapons, comprising a
  a polarimetric transmitter/receiver module which is configured to switch between horizontal and vertical polarized signal transmissions utilizing a transmitter antenna;
  a receiver configured to receive a back scattered signal and split the received signal into vertical (V) and horizontal (H) components;
  A2D configured to receive said vertical (V) and horizontal (H) components through V and H channels and converting the backscattered signals into digital signals;
  a processor configured to process the digitized signals for determining whether the object conceals explosives or weapons.

In accordance with certain embodiments, there is provided a method wherein said module being a Frequency Modulated Continuous Wave (FMCW) or pulsed or CW module.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
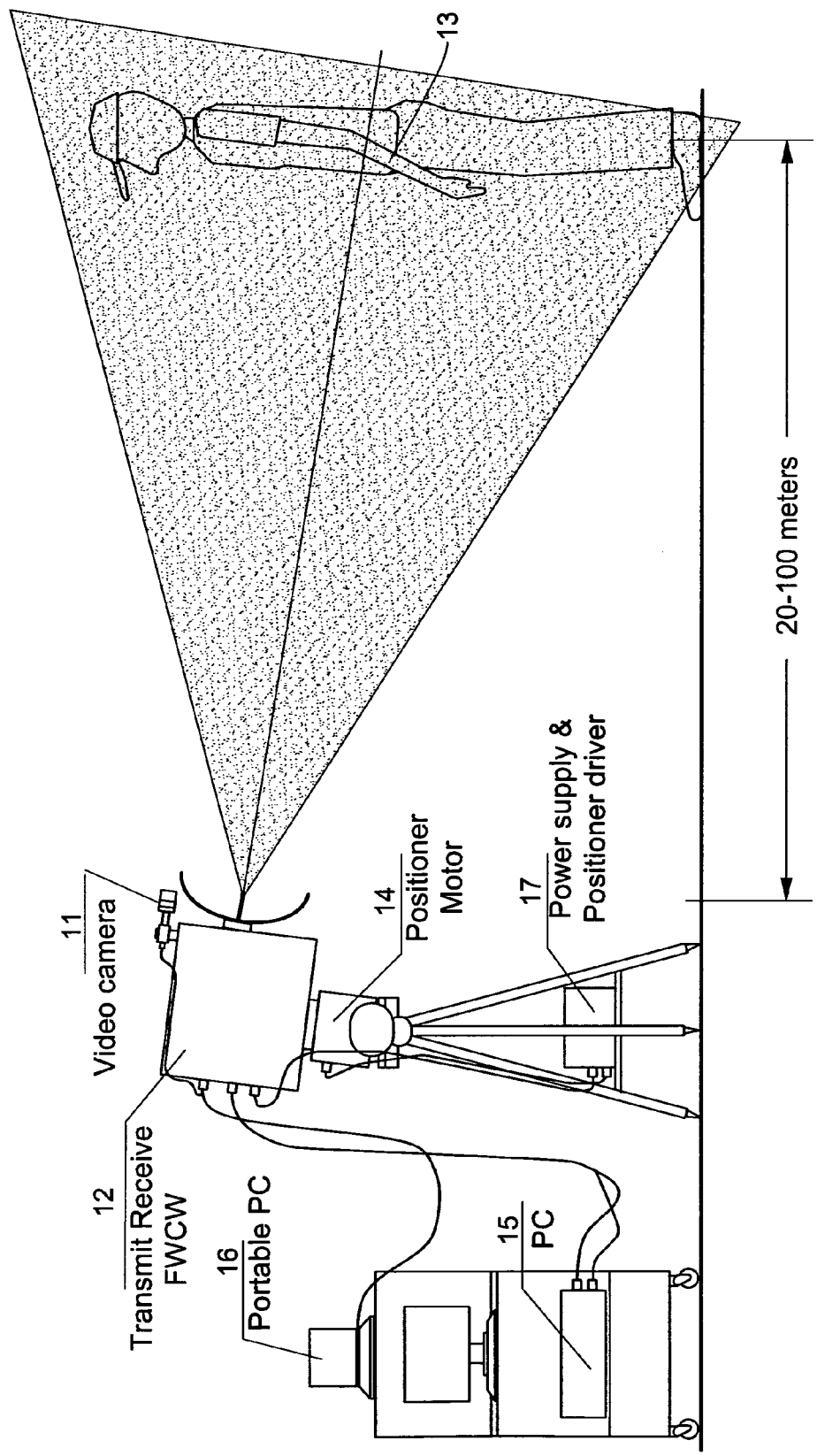
FIG. 1 illustrates a general schematic layout of a system in accordance with certain embodiments of the invention.

Turning now to FIG. 1, there is shown a general schematic layout of a system in accordance with certain embodiments of the invention. As shown a video camera fitted on system 12 (powered through power supply 17) that incorporates a transmitter/receiver radar system configured to transmit a Frequency Modulated Continuous Wave (FMCW) beam that covers the entire or part of the object of interest (by this particular example a suspected person 13 potentially carrying concealed explosives and/or weapon). An imaging means (such as video camera 11) is aligned with the operation radar system by means of positioning motor 14. System 12 communicates with computer 15 fitted with enhanced DSP capabilities for performing the pertinent processing of the reflected signals that are received by receiver of system 12, all as will be discussed in greater detail below. The computer 16 may be used for example for video recording of the scene and/or the resulting analysis (e.g. indication on whether explosive substances have been revealed).

Note that in accordance with certain other embodiments a pulsed or CW radar is used.

Figure 2:
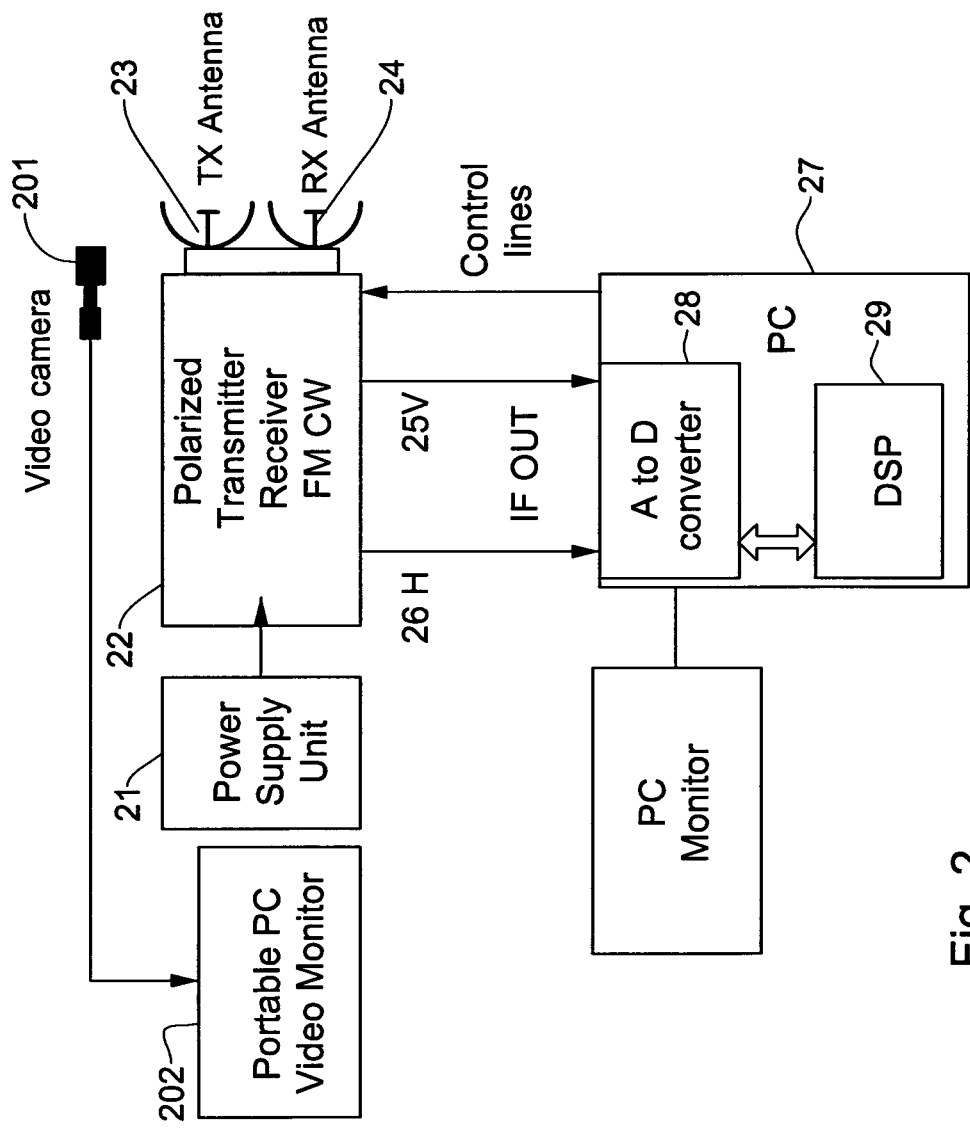
FIG. 2 illustrates a general system architecture, in accordance with certain embodiments of the invention.

Bearing this in mind, attention is drawn to FIG. 2, illustrating generalized system architecture in accordance with certain embodiments of the invention. As shown, the system includes a power supply unit 21 coupled to polarimetric transmitter/receiver FMCW module 22 which is configured to switch between horizontal and vertical polarized beam transmissions (through Transmitter antenna 23) towards the object of interest. The back scattered signal is received by receiver antenna 24, split into vertical (V) and horizontal (H), processed in module 22 and fed through two channels V (25) and H (26) to an A2D 28 and DSP 29 in computer 27. The PC and the associated DSP module 29 (serving for accelerating computation) are configured to process the digitized signal for determining whether the object conceals explosives or weapons, all as will be described in greater detail below. Also shown is a video camera 201 coupled to portable PC video monitor 202 for monitoring and perhaps pointing at a specific target. The target may conceal explosives or weapons. The video camera is aligned to antenna allowing receiving video image of the object that is illuminated by the radar beam. In accordance with certain embodiments the imaging means (such as the specified video camera) are not only configured to monitor the object of interest but may also serve to point at it (e.g. by a laser beam).

Since the transmitted signal is coherent, Doppler processing can also be performed thus generating four range-Doppler maps (one for each transmit-receive polarizations combination).

Note also that whereas the system of FIG. 2 illustrates a stationary radar designated to track moving object (such as armed human) or a stationary one (say explosives or weapons, hidden in, say bushes), it likewise applies to a moving platform (say an airborne radar) designated to track stationary or moving objects, mutatis mutandis. In accordance with certain embodiments the explosives or weapons may include hidden missiles or launchers concealed in say bushes.

Figure 3:
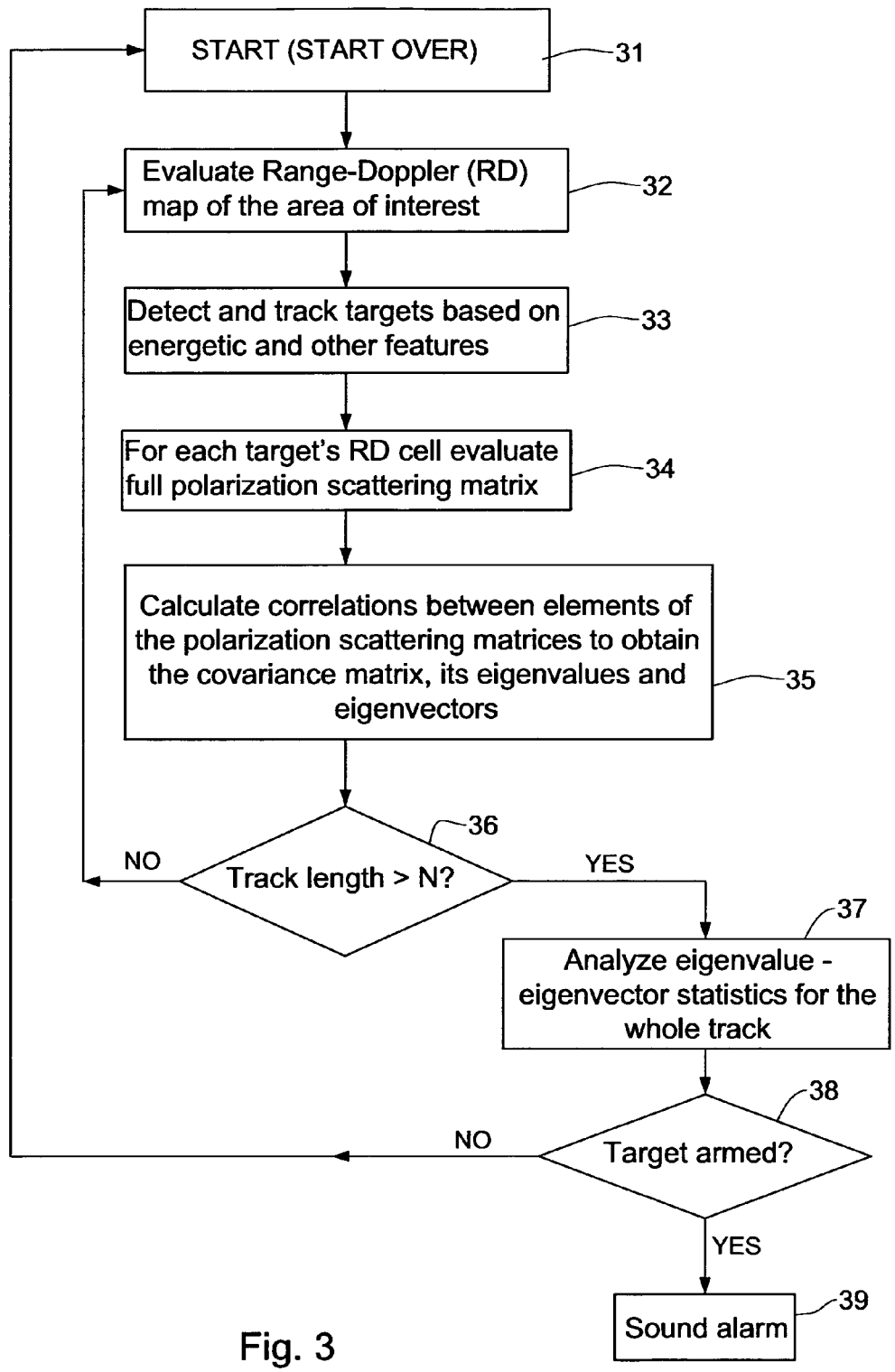
FIG. 3 illustrates a generalized sequence of operation of a system in accordance with certain embodiments of the invention.

Attention is now drawn to FIG. 3, illustrating a sequence of operations of signal processing steps, in accordance with certain embodiments of the invention. Thus, At step 31, the procedure for detection of concealed weapons or explosive commences. At stage 32, Range—Doppler maps are generated and evaluated. At stage 33 the target is detected and tracked based on energetic and dimensional features (sum of intensities in all polarization channels). Then (34), full polarization scattering matrices of RD (Range Doppler) cells belonging to the target are evaluated.

Next 35, correlations between elements of the polarization scattering matrices are calculated, to obtain the covariance matrix, its eigenvalues and eigenvectors, all as will be explained in greater details below.

The specified steps 31 to 35 are repeated while tracking the target and gathering its parameters as well as the results of the polarization correlations for several maps (e.g. 50), giving rise to track length, say in the latter example 50.

In the case that the track length exceeds 50, then in step 37, the eigenvalues' and eigenvectors' statistics are evaluated (in a manner that will be discussed in greater detail below). Based on the analysis, a decision is taken and indication is provided 38 whether a concealed explosive or weapon has been detected and if in the affirmative, appropriate measures (such as alarm) are activated 39.

In accordance with certain embodiments the detection of the concealed explosives/weapons can be synchronized with the imaging means which can either monitor the target object or point thereto in the case of detection.

For a better understanding of the computational steps described with reference to FIG. 3, attention is drawn to the following discussion:

Thus, in step 34, once a target is detected the scattering matrix S defined by equation 1:

$$\begin{bmatrix} E_h \\ E_v \end{bmatrix}_{rec} = \begin{bmatrix} S_{hh} & S_{hv} \\ S_{vh} & S_{vv} \end{bmatrix} \begin{bmatrix} E_h \\ E_v \end{bmatrix}_{tr} \quad (1)$$

where the transmission vector is composed of horizontally polarized signal (marked $E_h$) and vertically polarized signal (marked $E_v$).

The received back scattered digitized signals compose a 2×2 back scattering matrix with the following elements:

$S_{hv}$ standing for backscattered signal in the vertical channel (25 of FIG. 2) originated from transmitted horizontally polarized signal. Note that in armed human this value is relatively high compared to non armed human. The underlying rational is that unlike the human body which tends to scatter the impinging radar beam in the same direction (i.e. impinging horizontally polarized beam will be substantially back-scattered in the horizontal direction), the concealed explosives/weapons tend to scatter the impinging beam also in other directions. Thus, for example a horizontally polarized beam will be scattered also in the vertical direction.

$S_{hh}$, standing for backscattered signal in the horizontally polarized channel (26 of FIG. 23) originated from transmitted horizontally polarized signal;

$S_{vh}$, standing for backscattered signal in the horizontally polarized channel (25 of FIG. 2) originated from transmitted vertically polarized signal. Note that in armed human this value is relatively high compared to non armed human.

$S_{vv}$, standing for backscattered signal in the vertical channel (26 of FIG. 2) originated from transmitted vertically polarized signal.

Multiplying the transmission vector by the backscattering matrix results in the "received vector" composed of the $E_h$ and $E_v$ elements of equation 1.

In accordance with step 35, since the correlation between elements of the scattering matrix S over groups of Range Doppler cells are of interest, it is convenient to switch to a vector notation as follows (equation 2):

$$Z = \begin{bmatrix} S_{hh} \\ S_{vh} \\ S_{hv} \\ S_{vv} \end{bmatrix} \quad (2)$$

Further in accordance with step 35, the covariance matrix is then given by equation (3), as follows:

$$C = <Z \otimes Z^+> = = < \begin{bmatrix} S_{hh} \\ S_{vh} \\ S_{hv} \\ S_{vv} \end{bmatrix} \otimes [S_{hh}^* \ S_{vh}^* \ S_{hv}^* \ S_{vv}^*] > = = \quad (3)$$

$$\begin{bmatrix} <|S_{hh}|^2> & <S_{hh}S_{vh}^*> & <S_{hh}S_{hv}^*> & <S_{hh}S_{vv}^*> \\ <S_{vh}S_{hh}^*> & <|S_{vh}|^2> & <S_{vh}S_{hv}^*> & <S_{vh}S_{vv}^*> \\ <S_{hv}S_{hh}^*> & <S_{hv}S_{vh}^*> & <|S_{hv}|^2> & <S_{hv}S_{vv}^*> \\ <S_{vv}S_{hh}^*> & <S_{vv}S_{vh}^*> & <S_{vv}S_{hv}^*> & <|S_{vv}|^2> \end{bmatrix}$$

Note that each element in the the 4×4 covariance matrix includes two members selected from the group of $S_{hh}$, $S_{hv}$, $S_{vh}$ and $S_{vv}$ as discussed with reference to equation 1 above. Note also that "*" denotes the complex conjugate of the complex number and <> denotes average over all relevant cells. Thus, assuming that a given horizontally polarized beam impinges on a human target, it is likely that back scattered signals will be reflected from few locations of the human body. These multiply reflected signals are averaged and the average values $<|S_{hh}|^2>$, $<S_{hh},S_{vh}^*>$, $<S_{hh},S_{hv}^*>$, $<S_{hh},S_{vv}^*>$, $<S_{vh},S_{hh}^*>$, $<|S_{vh}|^2>$, $<S_{vh},S_{hv}^*>$, $<S_{vh},S_{vv}^*>$, $<S_{vh},S_{vd}^*>$, $<|S_{hv}|^2>$, $<S_{hv},S_{vv}^*>$, $<S_{vv},S_{hh}^*>$, $<S_{vv},S_{vh}^*>$, $<S_{vv},S_{hv}^*>$, and $<|S_{vv}|^2>$ are used in the correlation matrix.

Still in accordance with step 35, in order to analyze the properties of the covariance matrix C, the eigenvalues and its eigenvectors are calculated. As is well known, the sum of the eigenvalues is tr(C) (i.e. the total energy reflected from the target). The corresponding eigenvector gives the relative components of the four different combinations of transmit-receive (TR) polarization.

In accordance with certain embodiments, the eigenvalues are normalized (by dividing the matrix C by its trace to obtain tr(C)=1). The eigenvectors V are also normalized such that |V|=1. Note that the matrix C has four eigenvalues and corresponding four eigenvectors (one for each eigenvalue). In accordance with certain embodiments only the largest eigenvalue and its corresponding eigenvector values are considered. The invention is of course not bound by considering the eigenvalues/eigenvectors in the manner specified and not by the usage of the largest values thereof.

In accordance with certain embodiments all the information about polarimetric correlations is contained in the eigenvalues and eigenvectors of the matrix C. The description below elaborates, in accordance with certain embodiments, how to map different materials in the eigenvalue-eigenvector space.

Note that the invention is not bound by the specified notations. Note also that the implementation of steps 34 and 35 is not bound by the specified sequence of calculations.

The utilization of the eigenvalues and eigenvectors (as discussed by way of example above), for determining whether the object conceals weapons and/or arms (step 37 and 38) will be better understood with reference to FIGS. 4 and 5, below).

Figure 4:
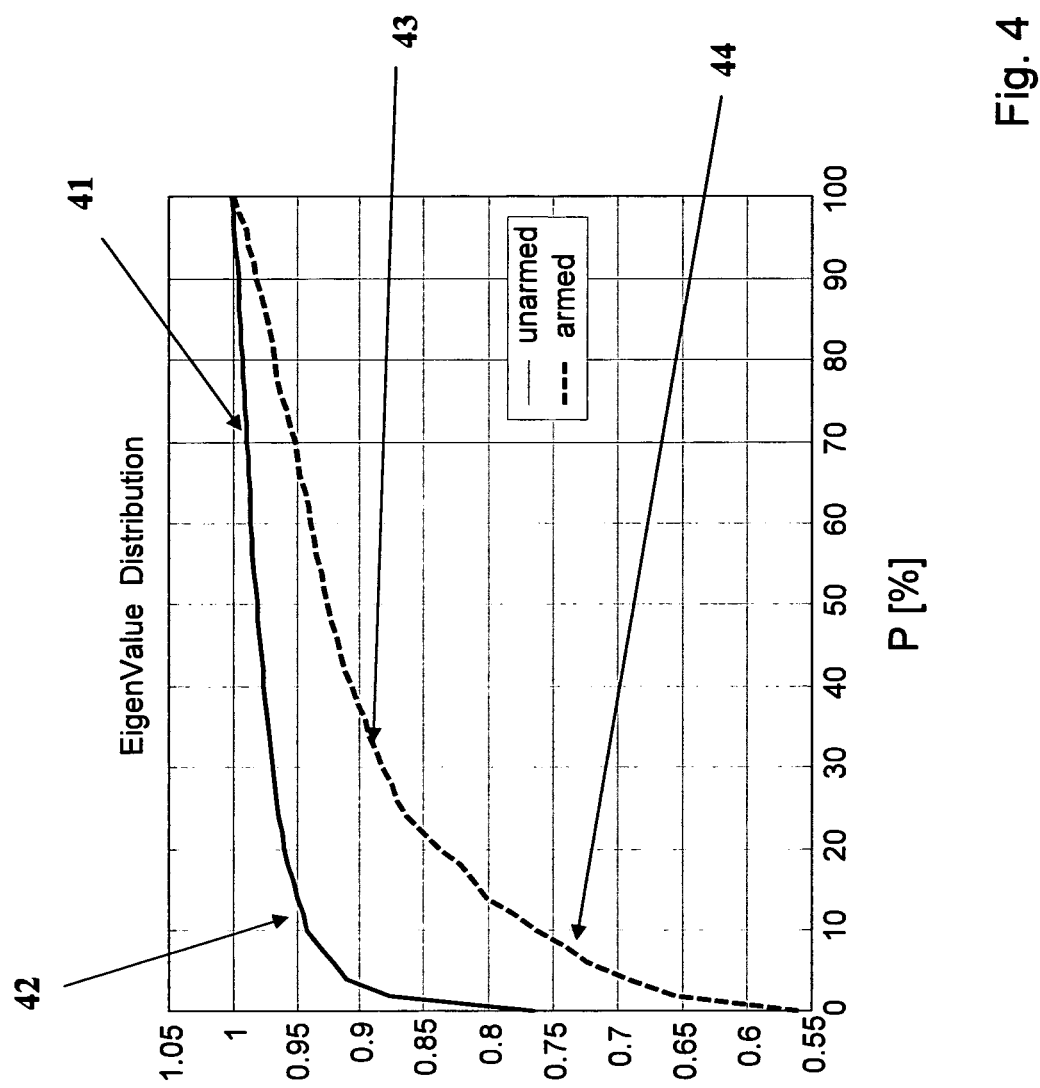
FIG. 4 is a graph representation illustrating utilization of threshold for identifying an armed human.

Turning first to FIG. 4, it illustrates graphs depicting a threshold serving for identification whether the object is armed or unarmed. The ordinate denotes the normalized eigenvalues whereas the abscissa denotes cumulative population percentage. As explained above, the normalized eigenvalue for an unarmed person is theoretically 1. However in real-life scenarios it is likely that certain deviations will be encountered. Accordingly, consider X (say 50) consecutive measurements (i.e. target detections). In each measurement horizontally and vertically polarized radar signals are transmitted towards the object, and the backscattered are separated into vertical and horizontal polarization components, and are then digitized and processed to obtain RD map and detect the targets. For each target the appropriate covariance matrix and its eigenvalues and eigenvectors are calculated in the manner discussed in detail above, and their values are recorded. Theoretically, for an unarmed person, a 100% of the population (i.e. all X measurements) should give an eigenvalue of nearly 1. This is denoted by the (x, y) value 41 on the cumulative distribution function of an unarmed person in FIG. 4. However in certain measurements say 5 measurements (i.e. 10% of the total 50 measurements) the eigenvalue is less than 0.95. This is denoted by the (x, y) value 42 and is within the expected statistical error.

Turning now to the dashed graph in FIG. 4 representing the eigenvalue cumulative distribution function of an armed object where, as discussed in detail above, a significant backscattering exists in the cross-polarized channel (i.e. transmitting a horizontally polarized signal yields significant vertically polarized backscattering and vise versa). Consequently, the resulting eigenvalue is in many cases (say for instance in 25% of the measurements namely in 13 out of the 50 measurements) less than 0.86 and for 10% less than 0.76. The latter points are depicted as (x, y) values 43 and 44 in FIG. 4 on the graph representing an armed person.

Note that the description with reference to FIG. 4 focused mainly on eigenvalues is more for illustrative purposes whereas more accurate results are achieved by analyzing not only the eigenvalues but also the eigenvectors.

Figure 5:
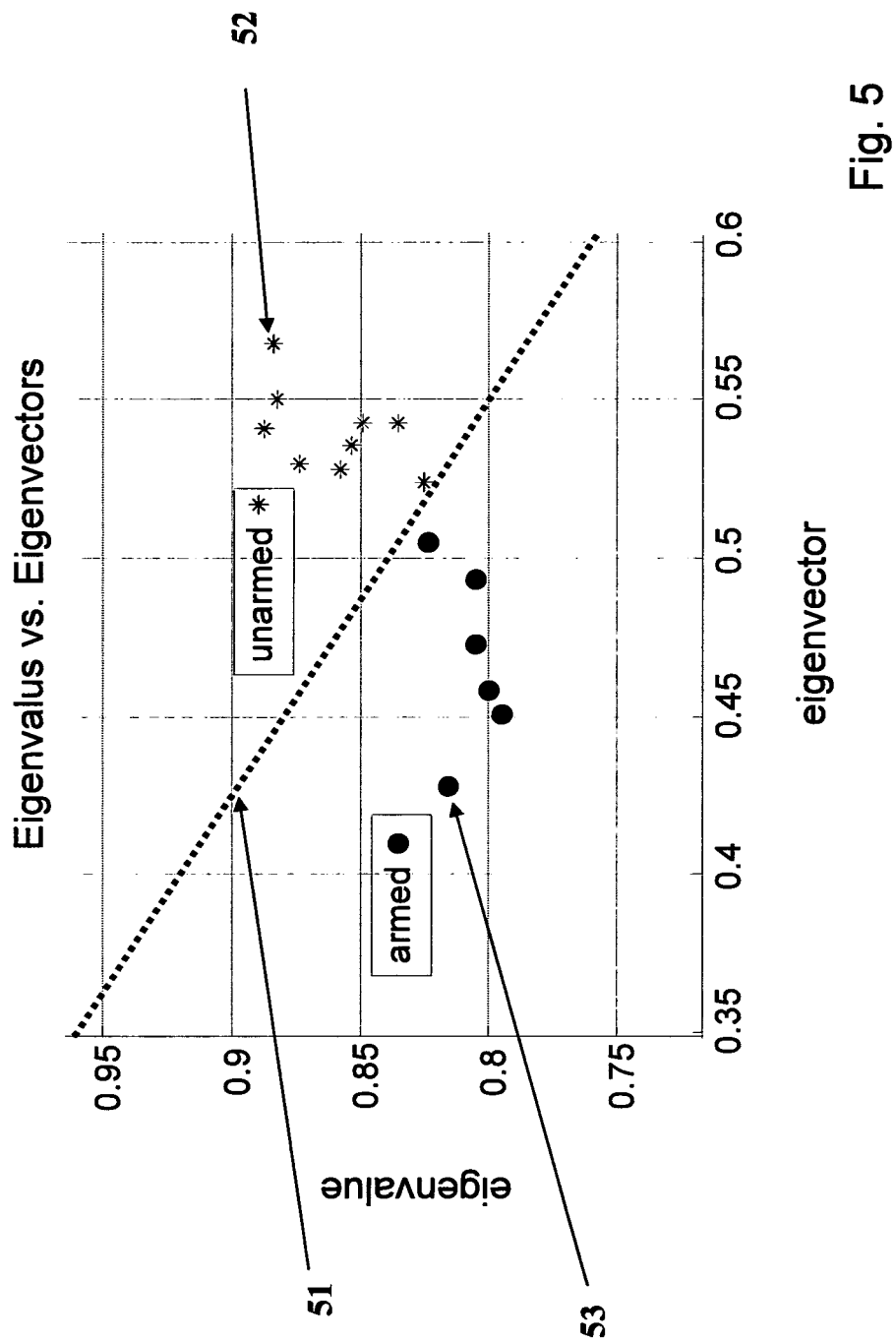
FIG. 5 is a graph representation illustrating utilization of Cumulative Distribution Function for identifying an armed human.

Turning now to FIG. 5, it shows a graph representation illustrating utilization of threshold for identifying an armed person. The data plotted are eigenvalues in the ordinate vs. eigenvectors in the abscissa. Line 51 separates the measurements such that points below the line (e.g. 53) indicate an armed person whereas points above it (e.g. 52) indicate an arm-free person.

Considering for example 50 measurements, each point depicted in FIG. 5 is at eigenvalue (ordinate) such that 10% of the targets' eigenvalues evaluated in these measurements are below it and at eigenvector (abscissa) such that 10% of the targets' eigenvectors evaluated in these measurements are below it. Thus considering (x, y) value 52, the ordinate value 0.89 denotes that 10% of the measurements (i.e. 5 out of 50) had eigenvalues that dropped below 0.89. The abscissa value of 0.54 indicates that 10% of the measurements (i.e. 5 out of 50) had eigenvectors that dropped below 0.54. Since the coordinates of 52 (0.54, 0.89) are such that this point is above the separating line 51, it belongs to an unarmed person (as was indeed the case). Turning now to the point 53 of FIG. 5, this point is at eigenvalue 0.82 and at eigenvector 0.43, namely, in 10% of the tested targets the eigenvalue was below 0.82 and similarly 10% of the tested targets had eigenvectors smaller than 0.43. Considering that the point 53 (0.43, 0.82 is below line 51, it belongs to an armed person (in agreement with the experimental setup).

In accordance with certain embodiments, it is sufficient to analyze one value of 50 measurements (e.g. 52 or 53 discussed above). In accordance with certain other embodiments a certain criterion may be applied to plurality of such points before conclusion is made, e.g. requiring that a cluster of few points that reside below line 51 in order to indicate a detection of an armed person.

This is denoted by the (x,y) value 52 indicating that 10% of the population has a normalized eigenvalue less than 0.9

In the case of detection appropriate means can be invoked such as alarm, orienting imaging means such as video camera towards the detected object, various kill means and/or others which the case may be.

Note that the numerical value in FIGS. 4 and 5 are provided for illustrative purposes only and do not necessarily reflect real life values.

Note that the invention is not bound by the specific utilization of eigenvalues and eigenvectors for determining armed or unarmed person, as described with reference to FIG. 5.

Assuming by way of non limiting example, that every measurement (including processing) takes about 60 msec then within 50 measurements (i.e. 3 seconds) an alarm can be activated in the case that an armed human has been detected. Note that in accordance with certain embodiments multiple targets can be tracked.

Unless specifically stated otherwise, as apparent from the following discussions, it is appreciated that throughout the specification discussions, utilizing terms such as, "processing", "computing", "calculating", "determining", "evaluating", "analyzing" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, any other type of media suitable for storing electronic instructions that are capable of being conveyed via a computer system bus.

The processes/devices (or counterpart terms specified above) and displays presented herein are not inherently related to any particular computer or other apparatus, unless specifically stated otherwise. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein. As used herein, the phrase "for example," "such as" and variants thereof describing exemplary implementations of the present invention are exemplary in nature and not limiting. Reference in the specification to "one embodiment", "an embodiment", "some embodiments", "another embodiment", "other embodiments" or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments" or variations thereof do not necessarily refer to the same embodiment(s). It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination. While the invention has been shown and described with respect to particular embodiments, it is not thus limited. Numerous modifications, changes and improvements within the scope of the invention will now occur to the reader.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While certain features of the invention have been illustrated and described herein, many modifications, substitutions, changes, and equivalents will occur to those skilled in the art. It is therefore to be understood that the appended claims are intended to cover all such modifications and changes as fall within the scope of the claims.

The invention claimed is:

1. A method for detecting hidden explosives or weapons, comprising
   (a) transmitting a radar signal in different polarization channels towards an object;
   (b) collecting back scattered energy in different polarization channels from the object;
   (c) determining parameters that are dependent upon at least the transmitted signal polarization channels and the backscattered energy polarization channels, providing an indication if there are hidden explosives or weapons associated with the object based on said parameters, wherein said determination of parameters stipulated in (c) includes
      i) evaluating full polarization scattering matrices of range Doppler cells that belong to the object;
      ii) calculating correlation between elements of the polarization scattering matrices averaged over said range Doppler cells, giving rise to a covariance matrix;
      iii) analyzing polarimetric results for the covariance matrix; the polarimetric results include the largest eigenvalue and the eigenvector that corresponds to it;
      iv) evaluating the distributions of said eigenvalue and eigenvector over several detections of the object;
      v) determining whether the combined results of these distributions belong to an armed object and if so:
      vi) generating an indication that there are hidden explosives or weapons associated with the object.

2. The method according to claim 1, wherein said different polarization channels being horizontal polarization and vertical polarization.

3. The method according to claim 2, wherein said transmitting being in circular polarization.

4. The method according to claim 1, wherein said object being a human.

5. The method according to claim 1, wherein said object being bushes and wherein said explosives or weapons are concealed in the bushes.

6. The method according to claim 1, further comprising acquiring images of said object.

7. The method according to claim 1, configured to be used on mobile platform for detecting hidden explosives or weapons associated with a stationary object.

8. The method according to claim 7, wherein said explosives or weapons include hidden missiles or launchers.

9. The method according to claim 1, configured to be used on a stationary platform for detecting hidden explosives or weapons associated with a stationary object.

10. The method according to claim 1, configured to be used on mobile platform for detecting hidden explosives or weapons associated with a moving object.

11. The method according to claim 1, configured to be used on a stationary platform for detecting hidden explosives or weapons associated with a moving object.

12. A system for detecting hidden explosives or weapons, comprising
   a radar transmitter configured to transmit a signal in different polarization channels towards an object;
   a receiver configured to receive back scattered energy in different polarization channels from the object;
   a processor configured to determine parameters that are dependent upon at least the transmitted signal polarization channels and the backscattered energy polarization channels, providing an indication if there are hidden explosives or weapons associated with the object based on said parameters, wherein said determination of parameters includes
      i) evaluating full polarization scattering matrices of range Doppler cells that belong to the object;
      ii) calculating correlation between elements of the polarization scattering matrices averaged over said range Doppler cells, giving rise to a covariance matrix;
      iii) analyzing polarimetric results for the covariance matrix; the polarimetric results include the largest eigenvalue and the eigenvector that corresponds to it;
      iv) evaluating the distributions of said eigenvalue and eigenvector over several detections of the object;
      v) determining whether the combined results of these distributions belong to an armed object and if so:
      vi) generating an indication that there are hidden explosives or weapons associated with the object.

13. The system according to claim 12, wherein the transmitter being a radar system configured to transmit a Frequency Modulated Continuous Wave (FMCW) or pulsed or CW signal.

14. The system according to claim 12, wherein
   the radar transmitter includes a polarimetric transmitter module which is configured to switch between horizontal and vertical polarized signal transmissions utilizing a radar transmitter antenna, and
   the receiver is configured to receive a back scattered signal and split the received signal into vertical (V) and horizontal (H) components.

15. The system according to claim 14, wherein said module being a Frequency Modulated Continuous Wave (FMCW) or pulsed or CW module.

16. The system according to claim 14, further comprising an A2D configured to receive the vertical (V) and horizontal (H) components through V and H channels and convert the backscattered signals into digital signals for processing by the processor.

* * * * *